United States Patent [19] [11] 4,198,483
Sogi et al. [45] Apr. 15, 1980

[54] PIPETTE EXCHANGE APPARATUS

[75] Inventors: Shinroku Sogi; Makoto Yoshinaga, both of Hachioji; Toshio Shinohara, Chofu; Ikuo Tawara, Hachioji, all of Japan

[73] Assignee: Olympus Optical Company Limited, Tokyo, Japan

[21] Appl. No.: 886,658

[22] Filed: Mar. 15, 1978

Related U.S. Application Data

[63] Continuation-in-part of Ser. No. 777,336, Mar. 14, 1977, abandoned.

[51] Int. Cl.$^2$ .......................... C12B 1/00; C12K 1/10

[52] U.S. Cl. ................................ 435/286; 73/423 A; 422/63; 422/100

[58] Field of Search ............................ 23/253 R, 259; 73/423 A; 195/127, 103.5; 422/63, 64, 65, 100

[56] References Cited

U.S. PATENT DOCUMENTS

| | | | |
|---|---|---|---|
| 3,175,734 | 3/1965 | Heiss | 23/253 R X |
| 3,832,135 | 8/1974 | Prozdowski et al. | 23/253 R X |
| 3,843,323 | 10/1974 | Quame | 23/259 X |
| 4,087,248 | 5/1978 | Miles | 23/259 X |

*Primary Examiner*—Michael S. Marcus
*Attorney, Agent, or Firm*—Toren, McGeady and Stanger

[57] ABSTRACT

A pipette exchange apparatus for use in a system for automatically culturing a biotissue or a cell includes a pipette mounting device for mounting a dividing and injecting means, a pipette supply device and a pipette feeding device.

3 Claims, 9 Drawing Figures

PIPETTE EXCHANGE APPARATUS

This is a continuation-in-part application of Ser. No. 777,336 filed Mar. 14, 1977 now abandoned.

BACKGROUND OF THE INVENTION

1. Field of the Invention

The present invention relates to a pipette exchange apparatus for use in a device for automatically culturing a biotissue or a cell.

2. Description of the Prior Art

In every field of medical science, biology, pharmacy, agriculture and the like, a technique of culturing biotissues and cells is an inevitable fundamental experimental technique for carrying out research on the cell level. Sub-culture of biotissues and cells, however, is technically difficult, and no stable cultured strain can be obtained.

Recently, a technique of gas culture in an incubator, i.e., a culture technique in particular gas atmosphere, has been promoted, and as a result, special cells such as the liver, nervous system, hypophysis cerebri and the like, which have hitherto been difficult to be cultured, can be cultured now.

The present measure for culturing such cells will be described as follows. At first, in order to carry out subculture, a predetermined number of cells is diluted by a culture solution, poured into a culture container such as a Petri dish and cultured in an incubator kept in a predetermined atmosphere as it is maintained still. After a lapse of a predetermined time, a predetermined culture container is taken out of the incubator for the purpose of checking the culture condition and the degree of cell proliferation is examined by a microscope. When it is confirmed that the cells aimed at are proliferated by filling up the container, the container is replaced to a clean bench under asepsis condition, the culture solution in the culture container is sucked by a pippette and thrown away, the cells remained in the container is washed by injecting a buffer solution, and the buffer solution used for such washing is again sucked and thrown away. Then, in order to separate the cells embedded on the bottom surface of the culture container and proliferated from the culture container, an enzyme such as trypsin is injected therein, left as it is for several minutes and thrown away. After leaving for several minutes, a culture solution is again injected. This culture solution has the action of stopping activity of the trypsin. After injecting and stirring, the culture solution is moved to a centrifugal tube and centrifuged. A supernatant liquid of the thus centrifuged culture solution is absorbed and thrown away. A culture solution is injected and stirred to refloat the cells, a refloated cell-floating solution is injected into a culture container by every estimation and a culture solution is divided and injected for obtaining a predetermined concentration. The culture container after completion of the dilute dividing and injection operation is taken out of the clean bench, moved into the incubator kept in a predetermined atmosphere, stood still, and culture is again started.

However, the above explained measure has the following detects.

One of the defects is that in order to check the proliferation condition of a tissue or a cell by a microscope, it is often necessary to take the culture container from the incubator outside into the open air. Therefore, the culture condition is rapidly changed by taking it into the open air from a predetermined environmental condition such as gas atmosphere, temperature, humidity, etc., and as a result, the tissue or cell to be cultured is delicately changed. Because of the exposure to the open air, there is further caused contamination due to saprophyte. Thus, there is the susceptibility to a direct effect such as an influence caused by a change of the environmental condition and an invasion of saprophyte.

Another defect is that, since a technician manually carries out a sub-culture operation of the aforementioned cell separation-collection-dilution-division based on the result of observation by a microscope, his operation has a direct influence upon the cultured tissue or cell. That is, the prior culture operation cannot obtain standardized culture under a certain condition. The cultured tissue or cell depends upon the technician's experience and skill. Accordingly, it means that standardization and unification of the culture technique itself are very difficult. Even in case of carrying out a research of the same theme, therefore, various conclusions are derived according to each researcher.

A technician having enough culture technique should be trained for a number of years, and such technicians are absolutely in short supply. So, a researcher cannot be absorbed in his original study but must be spared his energy for the culture technique which is a subordinate problem.

From the above, there has been developed an automatic culture device aiming at prevention of air contamination caused by a conventional measure, removal of any influence of manual operation and automatic culture of standardized tissues or cells by standardizing and unifying each operation.

In this automatic culture device, a dividing injector is placed for moving the aforementioned proliferated cell from the culture container to the centrifugal separator, throwing the supernatant solution after centrifuge, injecting the culture solution into the centrifugal separator, dividing the refloated cell into a new culture container and the like, and the injector is placed in a culture room kept in a certain atmosphere, and the above operation is carried out in such culture atmosphere. In these operations, for example, a pipette used for throwing away the supernatant liquid after centrifuge is contaminated by the supernatant liquid, so that it is not preferable to use such pipette for injecting the next culture solution and dividing the cell into the new culture container.

SUMMARY OF THE INVENTION

An object of the present invention is to provide a pipette exchange apparatus having a device for mounting a pipette in a dividing and injecting means used for automatic culture in which a pipette used is exchanged every time.

Another object of the present invention is to provide a pipette exchange apparatus having a device for supplying a pipette to a dividing and injecting means used for automatic culture.

A further object of the present invention is to provide a pipette exchange apparatus having a device for feeding a pipette to a dividing and injecting means used for automatic culture in which the pipette can be moved between two different atmospheres from one to the other without any direct contact between the two atmospheres.

A pipette exchange apparatus for use in a system for automatically culturing a biotissue or a cell according to the present invention comprises a pipette mounting device for mounting pipettes on a dividing and injecting means, a pipette supply device for supplying pipettes to the device for mounting the pipettes, and a pipette feeding device provided between the pipette supply device and the pipette mounting device for feeding pipettes to the pipette mounting device in an automatic culture device.

According to the present invention, the pipette once used is immediately exchanged for a new one, so that the in using the invention contamination can be avoided. Accordingly, the present invention is significantly effective in an automatic culture device, in which sub-culture of tissues and cells should be carried out in a hermetically sealed container kept in a certain atmosphere where no contamination is allowed. Further, operation of pipette exchange is very simple, so that even if the exchange is automatically carried out in a sealed atmosphere, the exchange of the pipette is positively carried out.

The pipette supply device according to the invention can automatically supply pipettes used in an injector or the like of an automatic culture device and can further supply the pipette, particularly the top solution immersing portion thereof, under non-contacting state, so that any contamination due to saprophyte and the like can be completely prevented.

According to the pipette feeding device of the present invention, a culture room or housing kept in a certain culture atmosphere and provided with a dividing and injecting means and the like is in that state separated from the pipette supply device, and even in case of feeding the pipette into the room, the culture atmosphere is not in direct contact with the open air, i.e., the inside of the pipette supply device, so that when the pipette is fed into the room, the atmosphere in the culture room is not varied and the pipette, particularly the end thereof, does not contact any other object during transfer to the room, and as a result, any contamination can completely be prevented.

DESCRIPTION OF THE PREFERRED EMBODIMENT

Figure 1:
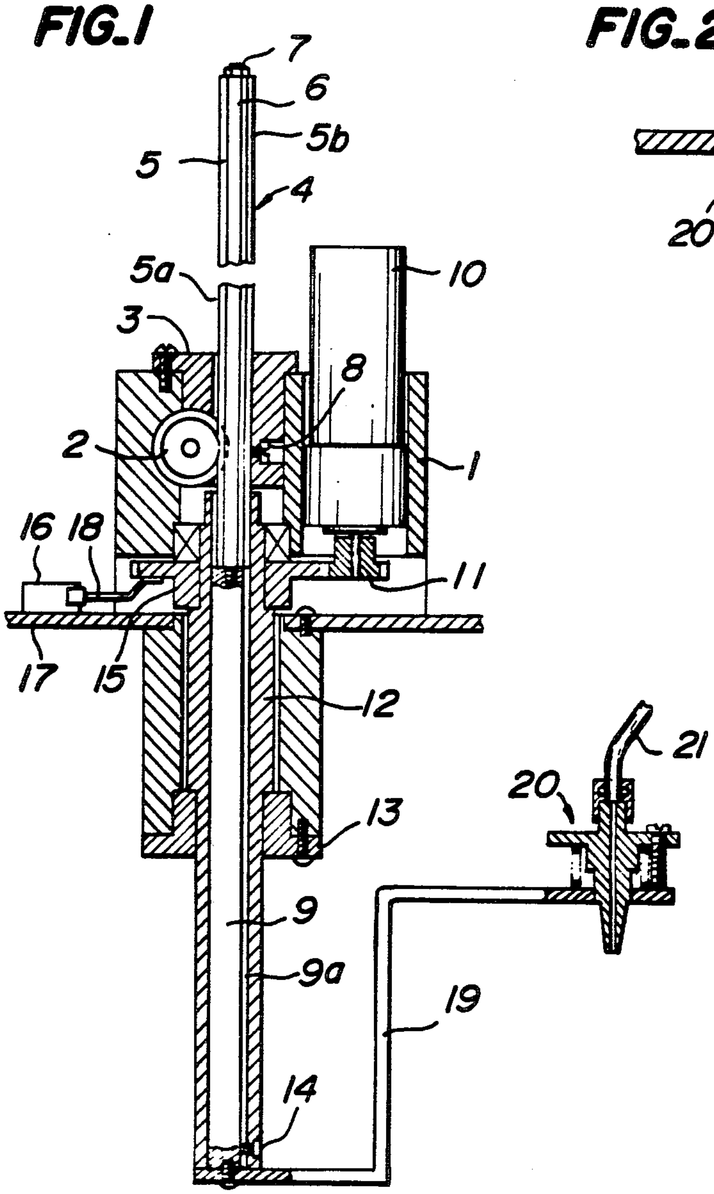
FIG. 1 is a cross-sectional view of the device for mounting a pipette according to the present invention.
Figure 2:
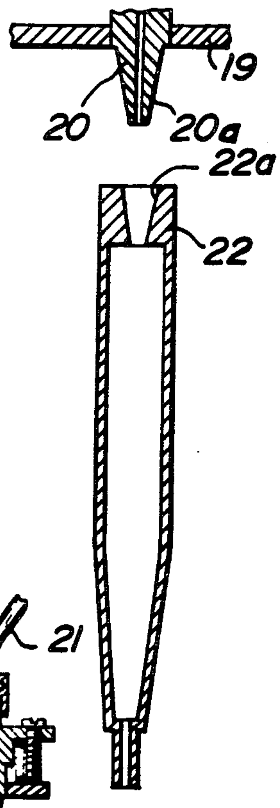
FIG. 2 is a partial view of the holding member used for the device according to the present invention and an enlarged cross-sectional view of the pipette.

Referring now to FIG. 1 one embodiment of a device for mounting a pipette in a dividing and injecting means used for automatic culture is shown. In FIG. 1, reference numeral 1 is a main body, reference numeral 2 is a pinion rotated by a proper driving means arranged an the main body 1, numeral 4 is a vertically movable shaft held in a guide member 3 secured to the main body 1, this vertically movable shaft 4 consists of an outer sleeve 5 provided with a rack 5*a* geared with the pinion 2 on one side surface and formed with a key groove 5*b* on the other side surface and a shaft 6 rotatably engaged within the outer sleeve 5. Numeral 7 is a stop member, numeral 8 is a key fixed to the guide member 3, numeral 9 is another shaft having a key groove 9*a* fixed to the lower end of the shaft 6, numeral 10 is a motor placed on the main body 1, numeral 11 is a gear rotated by the motor 10, numeral 12 is a rotary shaft engaged with the shaft 9 and rotatably held by a keep plate 13 against the main body 1, numeral 14 is a key fixed to the rotary shaft 12, numeral 15 is a gear in meshed engagement with the gear 11 and fixed to the rotary shaft 12, numeral 16 is a micro switch placed on an adapter plate 17, numeral 18 is a contact of the micro switch fixed to the gear 15, numeral 19 is an arm fixed to the lower end of the vertically movable shaft 4, i.e., the lower end of the shaft 9, and numeral 20 is a holding member provided with a tube 21 used for sucking and exhausting a sample. This holding member 20 is, as enlarged in FIG. 2, tapered at one end 20*a*, and a taper-shaped portion 22*a* of a pipette 22 is engageable therewith.

In the device having such construction, when the pinion 2 is rotated, the rack 5 engaged therewith is moved vertically. The outer sleeve 5 is therefore moved together with the shaft 6 vertically, that is, the whole body of the vertically movable shaft 4 is moved vertically, so that the arm 19 fixed to the lower end of the shaft 9 is also vertically moved as is the holding member at its end. When the motor 10 is rotated, then the rotary shaft 12 is rotated through the gear 11 and the gear 15, so that the arm 19 is rotated around the shaft 9.

The function of the invention will be explained with reference to an example such that the device according to the invention is placed in the centrifugal tube and the centrifuged and proliferated cell is divided. The pipette delivered by a proper conveying mechanism (not shown) is stopped at a predetermined position. If the motor 10 of the device according to the invention is rotated, then the rotary shaft 12 is rotated as described above and the arm 19 is rotated. When the holding member fixed to the end of the arm 19 comes on the stopped pipette, rotation of the arm is stopped by the action of, for example, the microswitch 16. When the pinion 2 is rotated by a proper driving device, the vertically movable shaft is vertically moved. In this case, the shaft is lowered from the illustrated height. The arm 19 is then lowered down, the holding member 20 at the end thereof is also lowered down, and the end 20*a* of the holding member 20 is inserted into the pipette 22 and engaged. After the insertion of the holding member 20, the pinion 2 is reversely rotated and the arm 19 is raised. If the motor 10 is further rotated, the arm 19 is rotated and moved onto the centrigual tube (not shown). When the pipette is placed on the centrifugal tube, the arm 19 is lowered down in the same manner as described above, and the end of the pipette 22 is inserted into the centrifugal tube. A sucking and exhausting device sucks the supernatant liquid only separated in the centrifugal tube and throws it away. When the supernatant liquid is thrown away, the contaminated pipette is taken out of the centrifugal tube by vertical movement and rotation of the above arm and taken out of the holding member at a predetermined position. A new pipette is then stopped at a predetermined position by means of a conveying device and the same operation as described above is carried out, thereby mounting the pipette on the holding member, inserting into the centrifugal tube injected a culture solution therein, and stirred by the operation of repeated absorption and injection for refloating the cells.

Such operation is repeated that the supernatant liquid is thrown away from the centrifugal tube, the culture solution is injected, and when the aggregated cells are refloated one by one, each cell is absorbed and injected into a previously prepared Petri dish by every estimation and the like. When a sample in one centrifugal tube is divided, division to the next centrifugal tube is repeated in the same manner.

Figure 3:
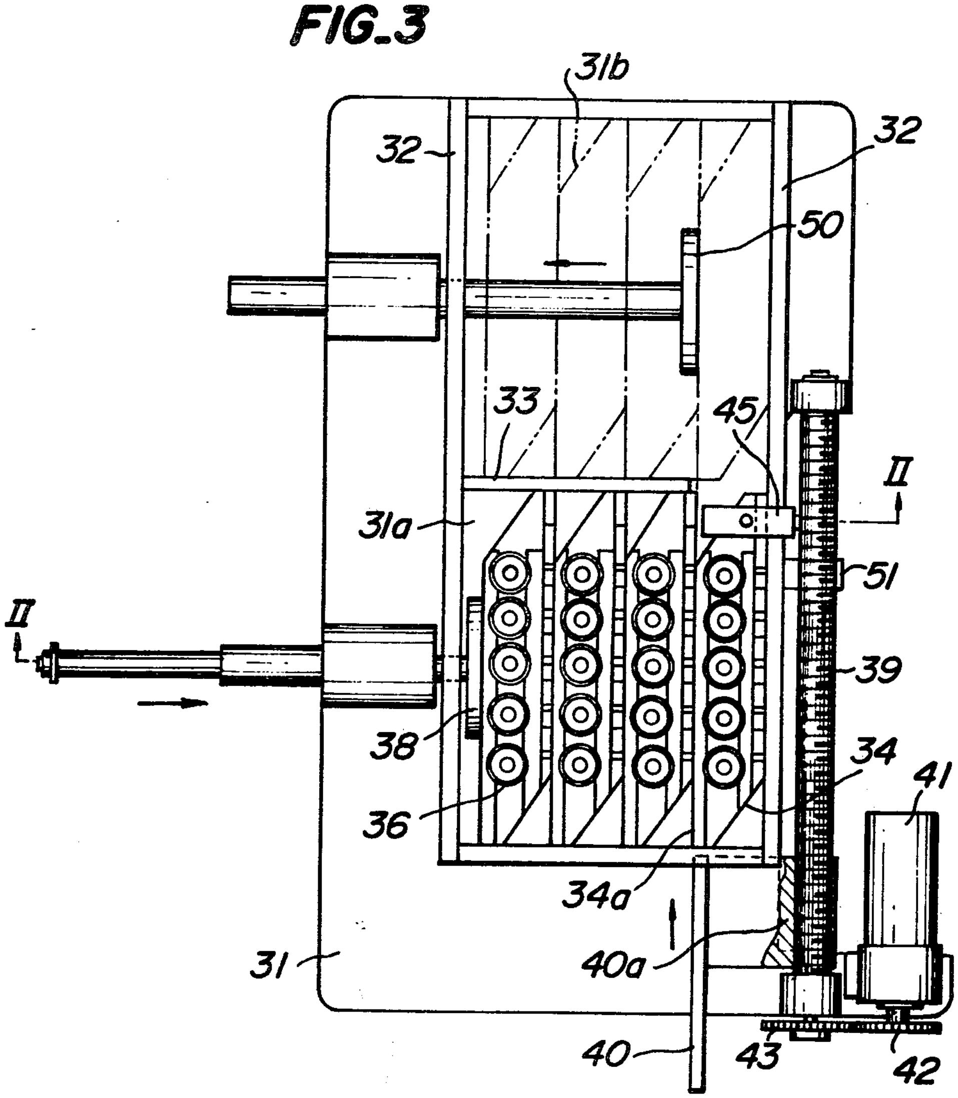
FIG. 3 is a plan view of the present invention.
Figure 4:
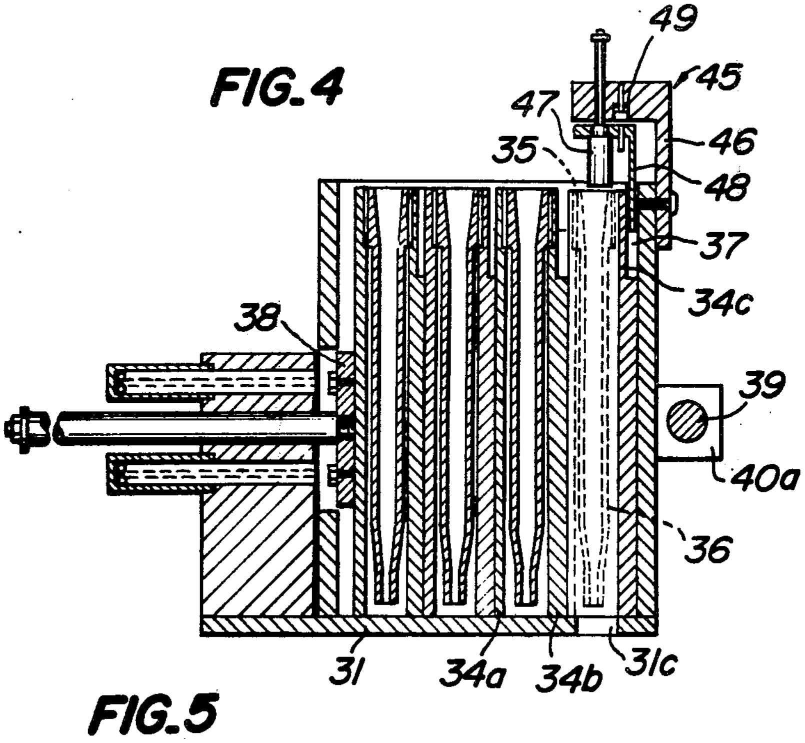
FIG. 4 is a cross-sectional view taken along the line II—II of FIG. 3.

FIG. 3 shows one embodiment of a device for supplying a pipette to a dividing and injecting means used for automatic culture according to the present invention.

Figure 5:
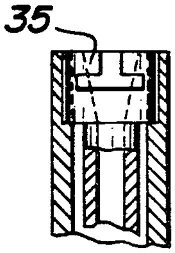
FIG. 5 is an enlarged view of the pipette holding member.
Figure 6:
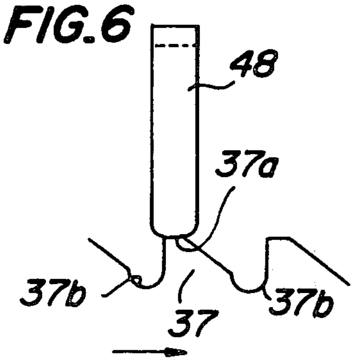
FIG. 6 is an explanatory view showing the action of the actuating piece of the pipette dropping mechanism.

In FIG. 3, numeral 31 is a body of a supply device, numeral 32 is a frame, numeral 33 is a partition frame, numeral 34 is a pipette holder having a shape shown from the upper portion which is almost a parallelogram and side surfaces consists of two side plates 34*a* and 34*b* and the upper and lower directions thereof are opened without any cover. Further, the upper portion is ring-shaped as shown in FIG. 5, provided with a plurality of pipette holding members 35 having the action of a spring, thereby holding a plurality (number of the holding members) of pipettes 36. Further, on one side plate 34*b* is formed a step portion 34*c*, and in the step portion 34*c* is provided a cam 37 having a shape shown in FIG. 6. A plurality (4 in the drawing) of these pipette holders 34 are provided within one space 31*a* formed by the body frame 32 and the partition frame 33. Numeral 38 is a holder pusher for constantly pushing the pipette holder 34 in the arrow direction, numeral 39 is a feed screw, numeral 40 is a feed plate having a screw portion 40*a* screwed into the feed screw 39, numeral 41 is a motor for rotating the screw 39 through gears 42 and 43, numeral 45 is a pipette dropping mechanism consisting of a hook-shaped supporting arm 46 fixed to the main body frame 32, a pipette dropping bar 47 vertically movably supported thereto, an actuating piece 48 fixed to the pipette dropping bar 47 and being adjacent to the cam 37 at the end as shown in FIG. 6, and a spring 49 constantly depressing the pipette dropping bar 47 downwards. In addition, beneath the pipette dropping bar 47 at the portion fixed to the pipette dropping mechanism 45 is formed a hole 31*c* having a diameter slightly larger than that of the pipette. Further, numeral 50 is a pusher of a holder which has been supplied the pipette.

The function of the supply device according to the invention will be explained as follows. At first, as shown in FIG. 3, the pipette holder 34 holding a plurality of sterilized pipettes 36 secured to the holding member 34 is provided in one space 31*a* enclosed with the main body frame 32 and the partition frame 33. Then, the motor 41 is rotated to rotate the feed screw 39, and then the screw portion 40*a* screwed thereto is moved in the arrow direction together with the feed plate 40. With movement of this feed plate 40 the feed plate 40 pushes the side plate 34*a* of the pipette holder 34 (right side in the drawing) provided in the space 31*a* so as to move the pipette holder 34 to the arrow direction. With movement of this pipette holder 34, the uppermost pipette in FIG. 3 held by the pipette holder 34 reaches the position of the pipette dropping mechanism 45, and at that time the actuating piece 48 of the pipette dropping mechanism 45 comes a portion 37*b* in a recess of the cam 37 (having the shape shown in FIG. 6) provided in a recess portion 34*c* of the side plate 34*b* of the pipette holder 34, and as a result, the pipette dropping bar 47 is moved from a land 37*a* to a recess 37*b* of the cam, rapidly dropped down by force of the spring, so as to thrust down the pipette. When the pipette holder 34 is pushed in the arrow direction, the pipettes held in the holding member 34 are successively dropped from the hole 31*c* and supplied. That is, if the cam 37 provided in each pipette holder is matched with the position where the recess portion 37*b* is secured to the holding member, when the pipette holder 34 is moved in the arrow direction, the cam 37, in FIG. 6, moves in the arrow direction against the actuating piece 48, the actuating piece 48 attached to the cam 37 and constantly pushed downwardly by the spring, is slowly raised to the land 37*a* along the inclined portion from the recess 37*b* and then rapidly dropped in the next recess 37*b*, so that the pipette dropping bar 47 is rapidly dropped, and pushes the pipette 36 lightly held by the holding member 35 so as to drop the pipette from the hole 31*c*. Thus, every time the actuating piece 48 enters the recess 376 of the cam 37, that is, the pipette comes just beneath the pipette dropping bar, the pipette in the pipette holder is dropped by the pipette dropping bar 47.

By repeating the above action, all the pipettes in the pipette holder are dropped, the pipette holder is inserted into the space 31*b* through a gap between the main body frame 32 and the partition frame 33 and fixed between the main body frames 31 and the holder pusher 50. On the other hand, if rotation of the motor 41 is reversed, the feed plate 40 is backed in the direction opposite to the arrow. At the same time, the second pipette holder is moved to the rightmost side in the drawing by the holder pusher 38. When the aforementioned action is repeated, the pipettes in the second pipette holder are successively dropped and supplied. In case of moving the second pipette holder in the arrow direction and further moving to the space 31*b* from the space 31*a*, since each pipette holder has the shape of almost parallel square base as shown in FIG. 3, the first pipette holder positioned in the space 31*b* is moved in the left direction by the second holder, and when the second holder is completely moved in the space 31*b*, two holders are positioned in parallel in the space 31*b*. Thus, when each of the pipette holders provided in the space 31*a* completes its supply of pipettes, the empty pipette holders are moved to the space 31*b*. Then, if the empty holders are removed and new holders are provided in the space 31*a*, supply of pipettes can be continued in the same manner.

The above explanation relates to continuous movement of the feed plate 40, but from the reason for securing a drop of the pipette, the feed plate is stopped for a short time when the pipette to be dropped in the pipette holder comes into the position of the pipette dropping mechanism. Therefore, a microswitch is fixed at a position shown by reference numeral 51, while the fixing plate positioned in parallel to the feed screw fixed to the screw portion 40*a*, of the feed plate 40 is provided with contacts for actuating the microswitch 51 at intervals equal to those of the pipettes (not shown), and as a result, every time a pipette comes into the dropping position, the switch 51 is actuated so as to stop rotation of the motor and to stop the feed plate. In this case, it is preferable that a certain time after the rotation of the motor is stopped with the use of a timer, the motor is again rotated, and it is preferable to set the stopping time to the actuating time of receiving supply of the pipette.

Figure 7:
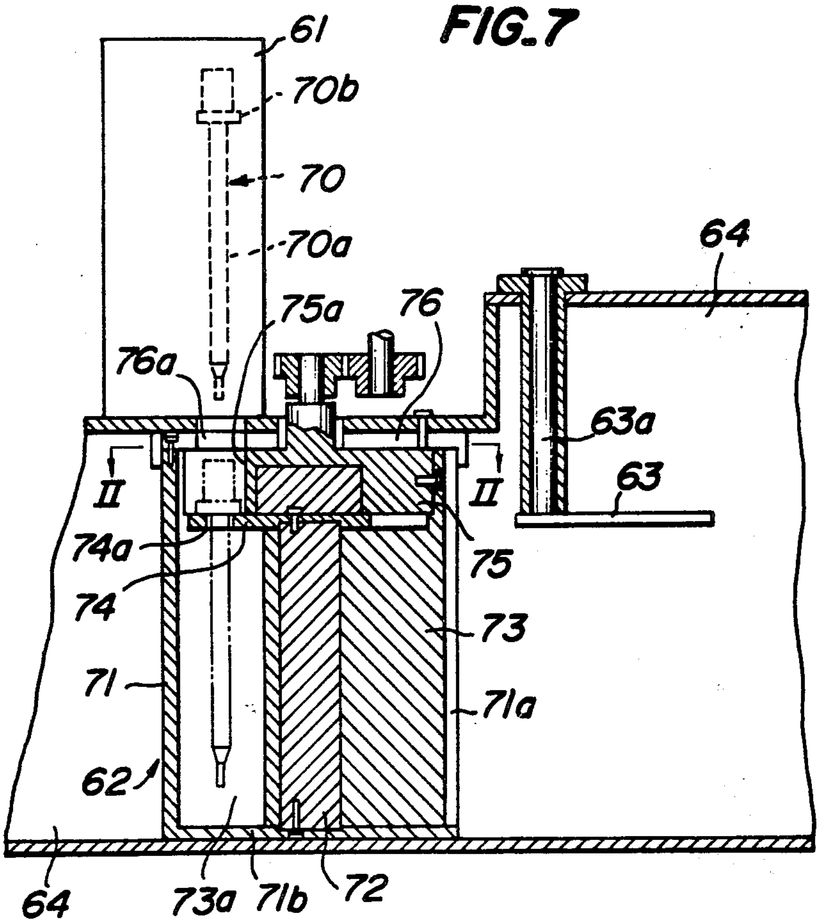
FIG. 7 is a cross-sectional view of the device according to the present invention.

FIG. 7 shows one embodiment of a device for feeding a pipette to a dividing and injecting means used for automatic culture according to the present invention.

In FIG. 7, reference numeral 61 is a pipette supply device, numeral 62 is a pipette feeding device having the construction which will be explained later, numeral 63 is a pipette holding arm provided rotatably around a shaft 63*a* and positioned in a room 64 kept at a culture atmosphere together with the other devices of a dividing and injecting means.

The detailed structure of the pipette feeding device 62 is explained. Reference numeral 71 is a main body of a cylindrical feeding device having an opening portion (outlet) 71*a* inter-connected to a culture atmosphere and covered with a bottom plate 71*b* at the lower portion, numeral 72 is a shaft fixed at the center of the main body 71, numeral 73 is a column-shaped rotary member having recess portion 73*a* and provided in the main body 71 for rotating around the shaft 72. Numeral 74 is a guide plate having a guide groove 74*a* fixed to the shaft 72, numeral 75 is a rotary plate provided for moving a pipette along the guide groove by pushing and integrally rotated together with the rotary member 73 having a recess portion 75*a* for positioning the pipette thereon. Numeral 76 is a lid of the main body 71 having an opening (inlet) 76*a* for feeding the pipette.

Figure 8:
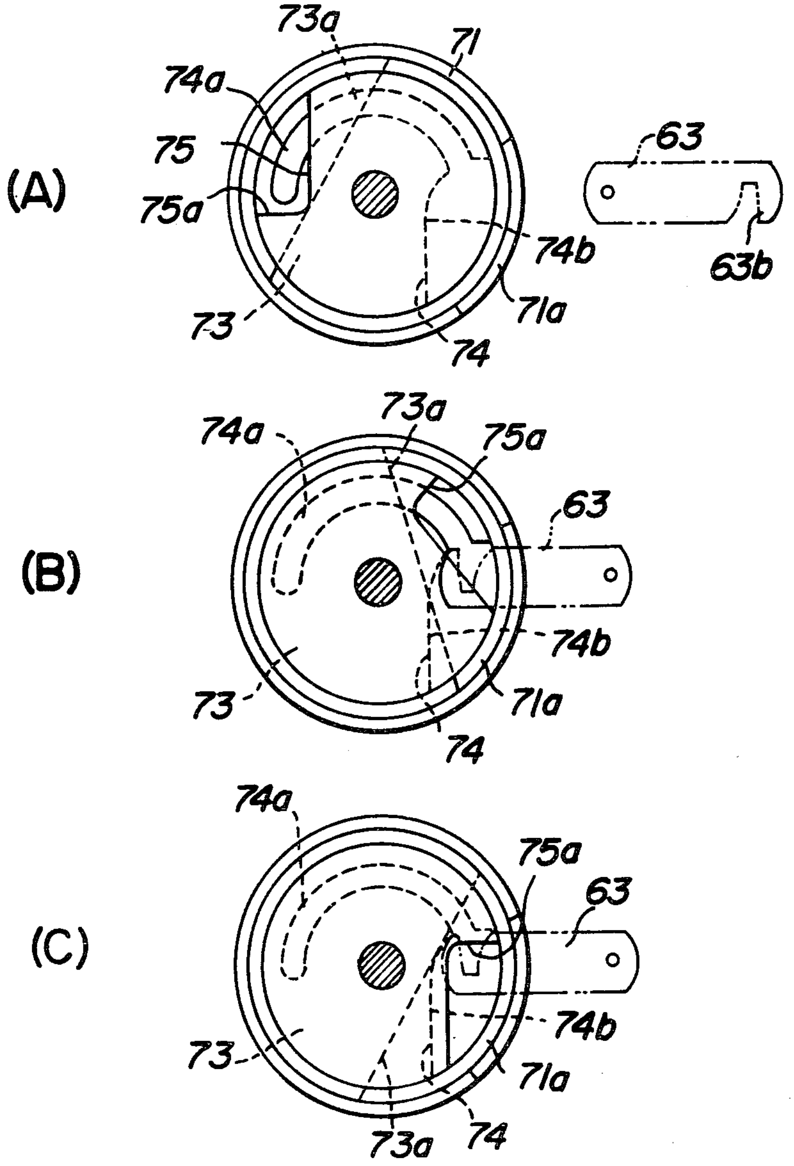
FIG. 8 illustrates cross-sectional views of three positions (A), (B) and (C) taken along the line II—II of FIG. 7.

The function of the pipette feeding device according to the invention is explained. In FIG. 7, when a pipette 70 fed from the pipette supply device 61 is positioned on the upper portion of the pipette feeding device 62, i.e., over the opening 76*a* of the lid 76, the pipette 70 is dropped. Then, the pipette 70 is inserted through the opening 76*a*, and the top portion thereof is inserted into the recess portion 73*a* of the rotary member 73 from the portion of the guide groove 74*a* of the guide plate 74. In this case, if the width of the guide groove 74*a* is made wider than the lower portion 70*a* of the pipette 70 but narrower than the upper portion 70*b*, the pipette 70 is held by the guide plate 74 as shown. Here, if the rotary member 73 and the rotary plate 75 are integrally rotated by a proper means in the clockwise direction in FIG. 8, the rotary plate 75 pushes the pipette with the recess portion 75*a* and moves the pipette. The pipette is moved along the guide groove 74*a* of the guide plate 74 by the action of this rotary plate 75. When the rotary member 73 and the rotary plate 75 are integrally rotated and moved from the position (A) to the position (B) shown in FIG. 8, the opening 71*a* formed in the main body 71, closed at the position (A) shown in FIG. 8 by the rotary member, is completely opened. In this case, the pipette holding arm 63 shown in FIG. 7 is rotated, the end portion thereof is inserted from the opening 71*a* as shown by a dotted line in FIG. 8(B), and positioned in the recess portion 74*b* of the guide plate 74. Under this state, if the rotary member 73 and the rotary plate 75 are further rotated, they reach the position shown in FIG. 8(C), and the pipette is moved from the guide groove 74*a* of the guide plate 74 to the recess portion 63*b* of the pipette holding arm 63 and is held in the holding arm. In this case, if the pipette holding arm 63 is again rotated, the pipette is moved accordingly and moved to the pipette holding device (not shown).

During the operation explained above, when the rotary member 73 and the rotary plate 75 are positioned at the place shown in FIG. 8(A), the opening 76*a* of the lid 76 is opened, but the opening 71*a* at the side wall of the main body 71 is completely closed by the rotary member 73. If the rotary member 73 and the rotary plate 75 are integrally rotated, the rotary plate 75 firstly closes the opening 76*a* of the lid 76 and the rotary member 73 closes the opening 76*a* of the lid 76. Thus, after the opening 76*a* is completely closed, the opening 71*a* of the main body 71 is opened as shown in FIG. 8(B). Further, as described above, after the holding arm 63 is rotated together with the pipette and moved from the opening 71*a* of the main body 71, the rotary member 73 and the rotary plate 75 are integrally rotated again, moved to the position shown in FIG. 8(A) and stayed until a new pipette is fed from the pipette supply device, but in this case, the rotary member 73 and the rotary plate 75 completely close the opening 71*a* of the main body 71 and then open the opening 76*a* formed in the lid 76. As a result, the pipette is again fed from the pipette supply device in the same manner.

The pipette exchange apparatus for use in a system for automatically culturing a biotissue or a cell comprises the pipette mounting device FIG. 1, the pipette supply device of FIG. 3 and the pipette feeding device of FIG. 7.

Figure 9:
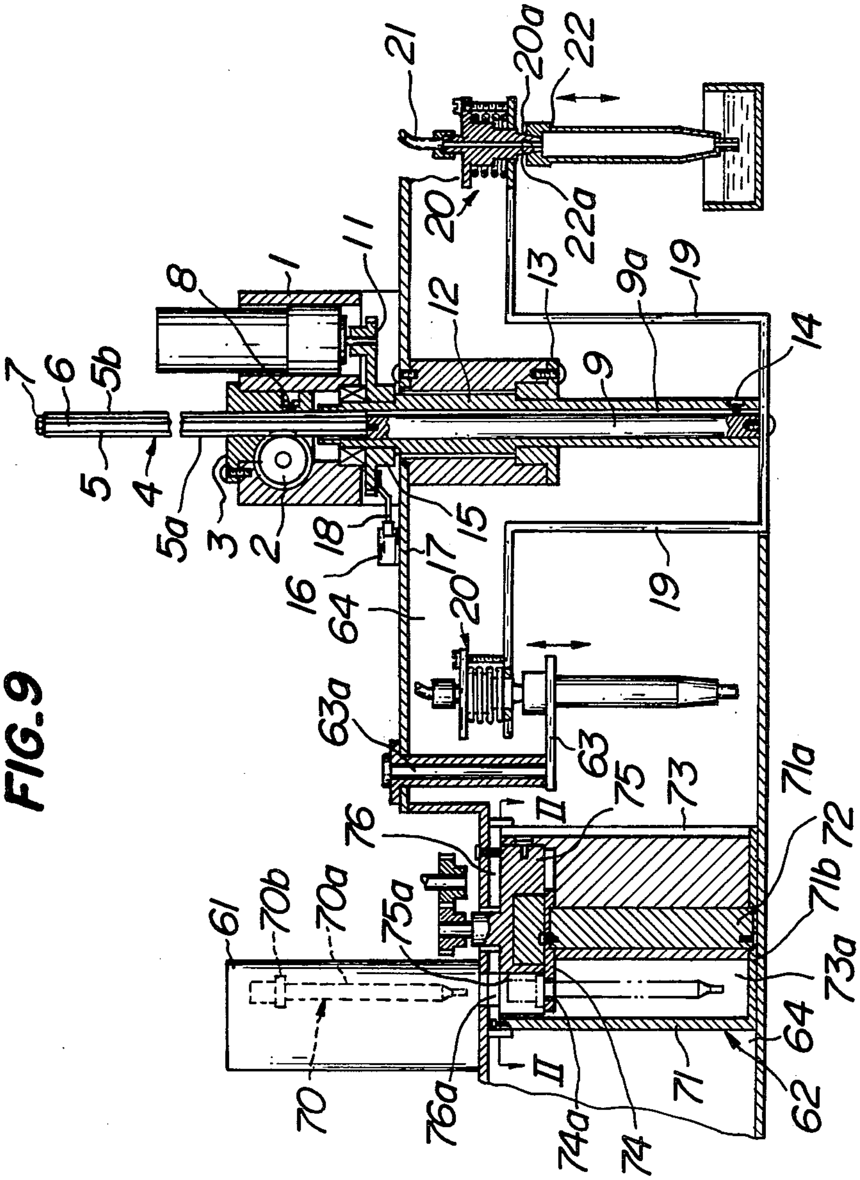
FIG. 9 is a cross-sectional view showing a pipette exchange apparatus according to the present invention.

FIG. 9 shows the pipette mounting device receiving pipettes from the pipette feeding device, the same reference numerals are used in FIG. 9 as in FIG. 1 and 7. The pipette mounting device is located in a culturing atmosphere and the feeding device conveys a plurality of pipettes one-by-one, from a supply device outside the culturing atmosphere to the mounting device in the culturing atmosphere.

What is claimed is:

1. A pipette exchange apparatus for use in a system for automatically culturing a biotissue or a cell comprising culturing atmosphere housing means, a holding member located in said housing means, a pipette mounting device for mounting pipettes one after another in said holding member in said housing means for effecting automatic culturing, a pipette supply device for supplying pipettes in a one-by-one manner, said pipette supply device located outside said housing means and a pipette feeding device arranged to receive pipettes one after another from said pipette supply device outside said housing means for feeding the pipettes to said pipette mounting device within said housing means, said pipette feeding device comprises a bottomed hollow container having an opening in the lid thereof for receiving pipettes from said supply means, and an outlet in a side wall thereof for communicating a pipette with said pipette mounting device, said pipette feeding device further having a fixed guide plate in said container, said guide plate having a guide groove therein for holding and moving a pipette in a guided manner, and a rotary member within said container for shielding the atmosphere at the inlet side from the interior of the culturing atmosphere of said housing means and for moving a pipette along said groove between the inlet side and the outlet side of said container.

2. A pipette exchange apparatus as claimed in claim 1, wherein said pipette mounting device comprises a main body, a vertical guide member secured to said main body, a vertically movable shaft arranged to move vertically along said guide member secured to said main body, a rotary shaft rotatable around said vertically movable shaft and arranged to move vertically together with said vertically movable shaft, an arm fixed to the lower end of said vertically movable shaft, and said holding member secured to an end of said arm and having a tapered end arranged to receive the tapered portion of a pipette and a tube for sucking or exhausting a sample or the like, whereby said arm is vertically or rotatably moved to mount a pipette on the top of said holding means.

3. A pipette exchange apparatus as claimed in claim 1, wherein said pipette supply device comprises a main body, a pipette holder provided in said main body for holding one of the pipettes at a time, a feed plate for moving said pipette holder in a direction transversely of the vertical direction, and a pipette dropping mechanism having a vertically movable bar for dropping individual pipettes, said pipette dropping mechanism secured to said main body, whereby said pipette holder is moved in the transverse direction by said feed plate and said movable bar is movable in a downward direction when each pipette is located in a predetermined position with respect to said movable bar so that pipettes are adapted to be dropped successively one at a time from said pipette holder through said inlet means of said lid.

* * * * *

UNITED STATES PATENT OFFICE
CERTIFICATE OF CORRECTION

Patent No. 4,198,483 Dated April 15, 1980

Inventor(s) Shinroku Sogi, et al

It is certified that error appears in the above-identified patent and that said Letters Patent are hereby corrected as shown below:

In the heading of the Patent [30] should read as follows:

[30] Foreign Application Priority Data

| | | |
|---|---|---|
| March 13,1976 | Japan | 51-27473 |
| March 19,1976 | Japan | 51-30230 |
| March 19,1976 | Japan | 51-30231 |

Signed and Sealed this

*Twenty-fourth* Day of *June 1980*

[SEAL]

*Attest:*

SIDNEY A. DIAMOND

*Attesting Officer* *Commissioner of Patents and Trademarks*